United States Patent [19]

Meyer

[11] 4,312,904

[45] Jan. 26, 1982

[54] FAST-HARDENING HYDRAULIC CEMENT MASS AND SURFACING METHOD USING THE MASS

[75] Inventor: Adolf Meyer, Leimen/Lingental, Fed. Rep. of Germany

[73] Assignee: Heidelberger Zement AG, Heidelberg, Fed. Rep. of Germany

[21] Appl. No.: 138,609

[22] Filed: Apr. 9, 1980

[30] Foreign Application Priority Data

Apr. 10, 1979 [DE] Fed. Rep. of Germany ....... 2914410

[51] Int. Cl.³ ........................... F16L 9/02; F16L 9/08; B32B 13/02
[52] U.S. Cl. ................................... 428/36; 52/309.17; 138/141; 138/144; 138/DIG. 6; 428/446; 428/703; 156/187
[58] Field of Search ............... 428/446, 310, 313, 414, 428/36, 703; 138/140, 141, 144, 147, 153, 172, 175, DIG. 2, DIG. 6; 156/184, 187; 52/309.14, 309.15, 309.17

[56] References Cited

U.S. PATENT DOCUMENTS

| | | | |
|---|---|---|---|
| 3,742,985 | 7/1973 | Rubenstein | 52/309.17 |
| 3,753,849 | 8/1973 | Duff | 428/414 |
| 3,767,435 | 10/1973 | Mori et al. | 106/89 |
| 3,949,144 | 4/1976 | Duff | 428/414 |
| 3,984,266 | 10/1976 | Christensen et al. | 428/446 |
| 4,067,164 | 1/1978 | McMillan | 428/310 |
| 4,133,928 | 1/1979 | Riley et al. | 428/446 |
| 4,159,361 | 6/1979 | Schupack | 428/306 |
| 4,192,690 | 3/1980 | Meyer et al. | 106/99 |

FOREIGN PATENT DOCUMENTS 1429167 3/1976 United Kingdom ................ 428/310

OTHER PUBLICATIONS

Pipeline and Gas Journal, P and G. J. Staff Report, (May 1975) p. 76.

*Primary Examiner*—William J. Van Balen
*Attorney, Agent, or Firm*—Kurt Kelman

[57] ABSTRACT

A hydraulically setting mass having a small tendency to cracking and a felt-like structure when freshly mixed while showing no cracks or only microscopic cracks when in the hardened condition comprises essentially a fast-hardening hydraulic cement binder, water, alkali-resistant mineral fibers and additives. The freshly mixed mass is applied in a layer to the surface of a tube or the like, the applied mass is completely covered with a sheet and the mass is pressed against the surface with the sheet.

15 Claims, No Drawings

FAST-HARDENING HYDRAULIC CEMENT MASS AND SURFACING METHOD USING THE MASS

The present invention relates to a hydraulically setting, fast-hardening mass having a small tendency to cracking and a felt-like structure when freshly mixed while showing no cracks or only microscopic cracks when in the hardened condition, and to a method of surfacing a rigid body with such a mass.

A mass of this type is very useful for coating a rigid body, particularly a ferrous tube, such as an iron or steel pipe. The cladding of such tubes with a corrosion-resistant mass is of considerable industrial importance since pipes laid in the ground, for example, must be protected against corrosion and resistant to all types of damaging environmental conditions. Hydraulically setting masses constitute an excellent coating material for such purposes since they are fully corrosion-, abrasion- and frost-resistant, fully protect against environmental conditions and have and impart to the coated body good impact and pressure resistance.

A coating mass of steel fiber reinforced concrete is known from "Pipeline and Gas Journal", May 1975, page 76. The coating serves primarily as a ballast for the tubing and prevents floating of the pipe line. In addition, it provides mechanical protection for the pipe. The steel fiber reinforcement enhances the pressure resistance of the concrete coating when the pipe line is laid in water at great depth and also imparts to the concrete the tenacity required to prevent breaking off of large chunks of the coating. However, steel fiber reinforced concrete provides no permanent protection against corrosion.

Within the last few years, iron and steel pipes have been coated with hydraulic concrete by spraying the concrete mass over the surface of the pipe. This coating method has a number of disadvantages. In the first place, the surface of the pipe must first be sand-blasted to impart to it a roughness required to enable the coating mass to adhere to the surface and not to slide off it. This is an expensive preparatory step which, nevertheless, does not always guarantee adherence of the coating mass to the surface. In addition, spraying of the concrete mass causes considerable quantities of the mass to rebound from the surface, which brings large material losses. The surface of the coating is rough and the thickness of the coating is non-uniform. The coated pipes can be stacked only after the concrete has hardened. Even when using rigorous production standards, it has been impossible to obtain fully satisfactory coatings since they do not adhere strongly to the pipe surface and tend to macroscopic cracking. However, the macroscopic cracks lower the corrosion protection since damaging substances can penetrate through the cracks and reach the metallic surface of the coated pipe.

It is the primary object of this invention to provide a hydraulically setting mass whose composition prevents the formation of macroscopic cracks whereby it provides excellent protection against corrosion when used as a coating, thus providing a very useful material for the manual or automatic surfacing of a rigid body on which it forms a permanent, strongly adhering coating which is not subject to macroscopic cracks.

It is another object of the invention to provide a surfacing method in which the mass may be applied in a layer of a desired thickness to the surface of a rigid body rapidly and without preparation of the surface, the applied mass forming a coating of uniform thickness with a smooth surface on the rigid body.

The above and other objects are accomplished according to the present invention with a mass of the first-indicated properties which comprises essentially a fast-hardening hydraulic cement binder, water, alkali-resistant mineral fibers, additives and aggregates optionally including natural sands or artificial sands.

According to another aspect of this invention, a method of surfacing a rigid body with a hydraulically setting, fast-hardening mass having a small tendency to cracking and a felt-like structure when freshly mixed, the mass comprising essentially a fast-hardening hydraulic cement binder, water, alkali-resistant mineral fibers and additives, comprises the steps of applying the freshly mixed mass in a layer of a desired thickness to the surface of the rigid body, completely covering the applied mass no later than immediately after application with a sheet, and pressing the mass against the surface of the rigid body with the sheet, the mass showing no cracks or microscopic cracks throughout the mass in the hardened condition.

The term "no later than immediately after application" indicates covering the applied mass with the sheet concurrently with the application of the mass or immediately thereafter.

The preferred mineral fibers are glass fibers but other alkali-resistant fibers, such as carbon or asbestos fibers, are also useful. The fibers are in chopped strands, or in the form of a woven or non-woven fabric.

Additives may be used in the mass to enhance the adhesion of the mass to a body and/or to an organic layer laminated to a layer of the mass, such as a layer comprised of a synthetic resin. The additives may also include water reducing agent. Furthermore, the additives may include as synthetic resin dispersions sealant agents.

A preferred fast-hardening cement binder is modified Portland cement containing among other phase a $11CaO.7Al_2O_3.CaF_2$ phase. A Portland cement with a hardening accelerator may also be used as cement binder.

If desired, the fast-hardening mass may form at least one layer of a laminate, another layer of the laminate adjacent thereto being comprised of synthetic resin. The laminate may consist of several alternating layers of the fast-hardening mass and synthetic resin which may be fiber-reinforced.

The mass may comprise an organic surface coating which may be fiber-reinforced and the coating may be detachable from the mass.

A mass of the above-described type is very useful as a surface layer on a rigid body, such as a ferrous tube including iron or steel pipes. It may be used generally to clad pipes of steel, cast iron, concrete, asbestos cement, ceramic or synthetic resin as well as for surface coating plates of such and like materials.

This mass for the first time provides an adherent, corrosion-resistant coating on the basis of a hydraulically setting matrix which can be applied in a thin layer on a rigid core and which retains, after hardening, all the properties desired for such a coating in an optimal fashion. When freshly mixed, the mass has a felt-like structure which conforms to the surface and adheres strongly thereto, the structure having great inner cohesion. It provides full corrosion protection for the coated body even in a gauge in the millimeter range. Thus, a coating with the mass of this invention may replace tin or synthetic resin coating of steel cores.

The mineral fibers in the mass form a micro-reinforcement in the coating. The fiber diameter is of an order of magnitude of about 10μ and thus corresponds to the size of the hydration products after the mass has hardened. This micro-reinforcement prevents detrimental macroscopic cracks. Possible microscopic cracks do not impair or reduce the corrosion protective property of the coating mass. Microscopic cracks may also be closed inherently by self-healing if the mass contains an excess of cement.

The method of the invention is particularly useful for coating a rigid body of circular or oval cross section and having an axis extending parallel to the surface to be coated. The body is positioned with the axis extending horizontally and turned about the horizontally extending axis while continuously applying the freshly mixed mass to the surface. The applied mass is completely covered by winding the sheet in the form of a continuous band about the applied mass as the rigid body is turned about the axis, and the mass is pressed against the surface of the rigid body by tensioning the band. The freshly mixed mass may be applied to the continuous band and the band wound about the surface of the rigid body while the body is turned, with the mass in contact with the surface.

The sheet forms a lost or detachable shuttering for the applied mass, i.e. it may remain on the mass, in which case an adhesive may be applied between the sheet and the mass, or it may be detached after the coating has been completed and the mass has at least partially set.

Preferably, the sheet is of impermeable material and may be fiber-reinforced to increase its tensile strength and impact tear strength. The reinforcing fibers of the sheet may be alkali-resistant and are preferably very strong.

The hydraulically setting mass of the invention may be applied securely and without difficulty by the described simple surfacing method. In this manner, all the advantages of an iron or steel pipe, for example, with a hydraulic cement binder may be combined and a very satisfactory end product may be obtained.

No sand-blasting of the surface to be coated is required in the surfacing method of the present invention, and the coating may be applied to pipes continuously and rapidly. The freshly applied coating mass cannot glide from the surface because it is retained thereon by the enrobing sheet which presses it against the surface. The mass may be applied very evenly so that a coating of uniform gauge is obtained. No material is lost in the preparation of the mass or its application to the surface since the applied mass is contained by the sheet. The mass is preferably seamlessly surrounded by the sheet so that a smooth skin is produced on the coating. Thus, the sheet plays an important role not only in the application of the mass but also after the coating has been completed since it produces a protective outer skin which also serves to assure the full hydration of the mass. This reduces or eliminates shrinkage of the hydraulically setting mass and concomitantly eliminates cracking. When the sheet or continuous band is used as support and transport means for the mass to the surface to be coated, a smooth and continuous processing is obtained. The method requires minimum investments and provides great savings in material since no material losses are incurred during the coating. By suitably adjusting the composition of the mass, for instance by incorporating fast-hardening cements, the production time can be shortened, thus further increasing the economy of the method. The manufacture may take place anywhere, also in the open.

The complete hydration assured by the method of this invention and the felting effect obtained by the presence of the fibers in the mass produces a coating of maximum tenacity and rigidity. This is particularly advantageous if the coating is thin. The coating has been found to meet all requirements for protective coatings to a high degree and to provide absolute protection against corrosion since it has no macroscopic cracks or damaged points in the hardened mass to give access to environmental hazards. It has the impact and pressure characteristics of the hydraulically set mass and adheres strongly to the surface. It is abrasion- and frost-resistant and has a controlled thickness of substantially uniform gauge. Pipes coated according to the invention have many other advantages. For instance, the coating gauge may be reduced without reducing the corrosion resistance. Since the coating increases the moment of inertia, the ovality of the pipe is reduced and its mechanical properties are improved. The surface property requirements are less rigorous. If desired, the coating may be calibrated. It is also possible to build in cut pipes. The selection of the coating gauge makes it possible to adapt the outer diameter of a pipe to a mechanical coupling, such as a fitting, so that a succession of pipes may be interconnected. The surfacing technique may be adapted without difficulty to rigid bodies of various shapes.

In a particularly economical, clean and very useful specific embodiment of the surfacing method of the present invention, the hydraulically setting, freshly mixed mass is applied, for example, to a band of polyethylene or of a tissue impregnated with bitumen, and this band is conveyed to a pipe positioned with its axis extending horizontally and turned about the axis. The consistency of the mass is adjusted to the coating requirements and the mass preferably has a desired adhesiveness, such as micro concrete, and this mass is applied through an extruder nozzle or a dispensing funnel to the moving band immediately before it reaches the turning pipe. With the mass in contact with the surface of the turning pipe, the band is then wound thereabout under tension to press the mass against the contacting surface. The band is so wound about the pipe that the mass forms a continuous coating on the pipe surface. Preferably, the continuous band is about 10 to 20 mm wider than the mass applied thereto. The abutting edges of the coating on the pipe surface are then covered by the edge strips of the band when it is wound about the pipe so that no water evaporates at these points. The pressure of the band against the mass can be obtained by tensioning the band in the longitudinal direction or by tensioning it by means of radially arranged pressure rollers bearing against the band. This assures a good bonding between the mass and the surface as well as a connection between the abutting portions of the applied mass.

If it is desired to provide special adhesion between the mass and the sheet, a suitable adhesive agent of any conventional composition may be applied therebetween.

Using a fast-hardening cement in the mass greatly decreases the setting time and this accelerates the production and makes it possible to stack the coated bodies rapidly.

The following Table 1 exemplifies some very useful compositions of hydraulically setting, fast-hardening masses which are particularly applicable to the surfacing method of the invention.

TABLE 1

| Mixture | Type of Cement | Proportions of Mixture Cement:Sand:Water (parts by weight) | Fiber Content Vol.-% | Dispersion Weight-% of Cement |
|---|---|---|---|---|
| 1 | PZ55 | 1 : 1 : 0.5 | 1.5 | 0.1 |
| 2 | PZ55 | 1 : 1 : 0.5 | 2.0 | — |
| 3 | SZ45 | 1 : 1 : 0.45 | 1.5 | 0.1 |
| 4 | SZ45 | 1 : 1 : 0.45 | 2.0 | — |

Data concerning some important properties of the mixtures of Table 1 are indicated in Table 2 hereinbelow.

TABLE 2

| Mixture | Hardening Time* | Crushing Strength after 28 Days N/mm$^2$ | Impact Strength after 28 Days KJ/m$^2$ | Failure Strain % |
|---|---|---|---|---|
| 1 | 8 h | 62 | 12 | 4 |
| 2 | 6 h | 58 | 13 | 3 |
| 3 | ½ h | 52 | 11 | 5 |
| 4 | ½ h | 49 | 10 | 4 |

*This refers to the number of hours the mass needs to set sufficiently to be transportable.

What is claimed is:

1. A rigid tube coated with a hydraulically set concrete mixture having a small tendency to cracking in the set condition, the concrete mixture comprising essentially a rapid hardening cement selected from the group consisting of modified Portland cement containing a 11CaO.7Al$_2$O$_3$.CaF$_2$ phase and a Portland cement containing a hardening accelerator, water, alkali-resistant glass fibers, aggregates and additives.

2. The coated tube of claim 1, wherein the additives include a water reducing agent.

3. The coated tube of claim 1, wherein the additives includes an agent enhancing the adhesion of the concrete mixture coating to the tube.

4. The coated tube of claim 1, wherein the concrete mixture comprises 1.5 to 2.0%, by volume, of the glass fibers.

5. The coated tube of claim 1, wherein the tube consists of steel, cast iron, concrete, asbestos cement, ceramic or synthetic resin.

6. The coated tube of claim 1, further comprising an organic surface coating on the concrete mixture coating.

7. The coated tube of claim 6, wherein the organic surface coating is detachable.

8. A method of coating a rigid tube with a hydraulically setting concrete mixture having a small tendency to cracking in the set condition, the concrete mixture comprising essentially a rapid hardening cement selected from the group consisting of modified Portland cement containing a 11CaO7Al$_2$O$_3$.CaF phase and a Portland cement containing a hardening accelerator, water, alkali-resistant glass fibers, aggregates and additives, which comprises the steps of applying the concrete mixture before setting in a layer of a desired thickness to a surface of the tube, competely covering the applied concrete mixture no later than immediately after application with a sheet, and pressing the concrete mixture against the surface of the tube with the sheet.

9. The tube coating method of claim 8, comprising the further steps of positioning the tube with its axis extending horizontally, turning the tube about the horizontally extending axis while continuously applying the layer of the concrete mixture to the surface of the tube, enveloping the applied layer with the covering sheet and pressing the enveloping sheet against the layer.

10. The tube coating method of claim 8, comprising the further steps of roating the tube, applying the concrete mixture before setting to the sheet, conveying the concrete mixture from the sheet to the surface of the rotating tube to apply the layer to the surface, and winding the sheet about the surface of the tube to cover the layer and press the concrete mixture against the surface of the tube.

11. The tube coating method of claim 9 or 10, wherein the sheet is a lost or detachable form for applying the concrete mixture layer to the surface of the tube.

12. The tube coating method of claim 11, further comprising the step of applying an adhesive between the sheet and the concrete mixture layer.

13. The tube coating method of claim 8, wherein the sheet is of impermeable material.

14. The tube coating method of claim 8, wherein the sheet is fiber-reinforced to increase its tensile strength and impact tear strength.

15. The concrete mixture of claim 8, wherein the additives include a water reducing agent.

* * * * *